(Model.)

T. K. WORK.
Snap Ring.

No. 239,291. Patented March 22, 1881.

Witnesses:

Thomas K. Work
Inventor
By atty

UNITED STATES PATENT OFFICE.

THOMAS K. WORK, OF MIDDLETOWN, CONNECTICUT.

SNAP-RING.

SPECIFICATION forming part of Letters Patent No. 239,291, dated March 22, 1881.

Application filed February 4, 1881. (Model.)

*To all whom it may concern:*

Be it known that I, THOMAS K. WORK, of Middletown, in the county of Middlesex and State of Connecticut, have invented a new Improvement in Snap-Rings; and I do hereby declare the following, when taken in connection with the accompanying drawings and the letters of reference marked thereon, to be a full, clear, and exact description of the same, and which said drawings constitute part of this specification, and represent, in—

Figure 1:
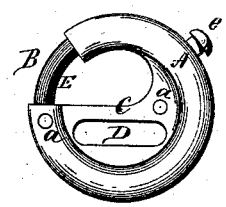
Figure 2:
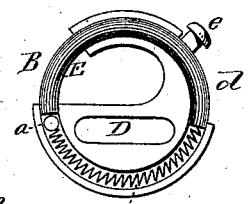
Figure 3:
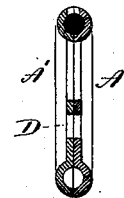

Figure 1, a side view; Fig. 2, a central section; Fig. 3, a transverse section.

This invention relates to an improvement in that class of snap hooks or rings in which the tongue or bolt is arranged in a tubular barrel, so as to move out or in said barrel to close or open the hook, the object being to practically make the hook in a ring shape; and the invention consists of the construction, as hereinafter described, and particularly recited in the claims.

The body A is in the shape of a tubular or hollow ring, with a portion at B cut away to form the mouth. Across the ring is a bar, C, forming a loop or space, D, by which it is attached to the strap. The body A is divided horizontally, so as to be cast in two parts, A A', Fig. 3. By casting this in two parts the ring is made hollow without a core, and then the two parts riveted together, as at $a$, Fig. 1. The rivets may be cast on one part and corresponding holes on the other part. Within the ring, and before the parts are put together, the bolt E is placed in the hollow of the ring, it being cast segment-shaped and to correspond with the curve of the ring, and also cast with a projection or thumb-piece, which extends through a slot in the outside of the ring, as seen at $d$, so that the bolt can be moved to close the opening B, or drawn into the ring to open it. Below the bolt, and in the hollow of the ring, a spring, $f$, (preferably a spiral spring,) is arranged, taking its bearing against a shoulder or rivet, $a$, at one end, the other bearing directly upon the bolt, so that drawing in the bolt compresses the spring, and the reaction of the spring throws the bolt outward. By this construction the device is made compact and in the desirable shape of a ring.

I do not broadly claim a ring-shaped snap-hook having the bolt a segment and arranged to work in the hollow of the ring, as such I am aware is not new; but What I do claim is—

1. The herein-described snap-ring, consisting of the hollow ring-shaped body A, with the bar C across it to form the loop D, a segmental-shaped bolt adapted to work in the hollow of the ring, and a spring to force the bolt outward, substantially as described.

2. The ring-shaped body A, divided horizontally, the two parts secured together to form the hollow in the body, and the segmental-shaped bolt, with a spring arranged in the hollow of the body, substantially as described.

THOMAS K. WORK.

Witnesses:
   GEO. M. MAIN,
   H. L. PARKER.